(12) United States Patent
Yamada et al.

(10) Patent No.: US 10,753,234 B2
(45) Date of Patent: Aug. 25, 2020

(54) TURNING APPARATUS AND CONTROL METHOD FOR TURNING APPARATUS

(71) Applicant: MITSUBISHI HEAVY INDUSTRIES COMPRESSOR CORPORATION, Tokyo (JP)

(72) Inventors: Masataka Yamada, Hiroshima (JP); Manu Agarwal, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 294 days.

(21) Appl. No.: 15/560,236

(22) PCT Filed: Mar. 24, 2015

(86) PCT No.: PCT/JP2015/058857
§ 371 (c)(1),
(2) Date: Sep. 21, 2017

(87) PCT Pub. No.: WO2016/151748
PCT Pub. Date: Sep. 29, 2016

(65) Prior Publication Data
US 2018/0051594 A1    Feb. 22, 2018

(51) Int. Cl.
*H02P 29/00* (2016.01)
*F01D 25/34* (2006.01)
(Continued)

(52) U.S. Cl.
CPC .............. *F01D 25/36* (2013.01); *F01D 21/00* (2013.01); *F01D 25/34* (2013.01); *F16H 1/20* (2013.01);
(Continued)

(58) Field of Classification Search
CPC ................................. H02P 29/00; F01D 25/34
See application file for complete search history.

(56) References Cited

U.S. PATENT DOCUMENTS

2010/0286817 A1*  11/2010  Goeking ................ A47K 10/26
                                                      700/231
2011/0283915 A1*  11/2011  Kumar ...................... B61F 5/30
                                                      105/218.1
(Continued)

FOREIGN PATENT DOCUMENTS

JP        2012-177328 A        9/2012

OTHER PUBLICATIONS

International Preliminary Search Report for corresponding International Application No. PCT/JP2015/058857, dated Jun. 30, 2015 (2 pages).
(Continued)

*Primary Examiner* — Bickey Dhakal
(74) *Attorney, Agent, or Firm* — Osha Liang LLP

(57) ABSTRACT

A turning apparatus includes: an electric motor; a pinion gear that rotationally drives a wheel gear provided in a rotor in a first rotation direction and moves to a first position where the pinion gear can transmit a rotation of the electric motor to the wheel gear and a second position where the pinion gear cannot transmit the rotation of the electric motor to the wheel gear; a current value detection unit that detects a current value of the electric motor in a state where the pinion gear is positioned at the first position; and a control device that controls the electric motor to rotate the pinion gear in a second rotation direction opposite to the first rotation direction based on the current value detected by the current value detection unit.

3 Claims, 4 Drawing Sheets

(51) Int. Cl.
*F01D 25/36* (2006.01)
*F01D 21/00* (2006.01)
*F16H 1/20* (2006.01)
*F16H 35/18* (2006.01)
*H02K 7/116* (2006.01)
*H02P 1/22* (2006.01)
*H02P 29/02* (2016.01)

(52) U.S. Cl.
CPC .............. *F16H 35/18* (2013.01); *H02K 7/116* (2013.01); *H02P 1/22* (2013.01); *H02P 29/00* (2013.01); *H02P 29/02* (2013.01); *F05D 2220/31* (2013.01); *F05D 2260/4031* (2013.01)

(56) References Cited

U.S. PATENT DOCUMENTS

| | | | |
|---|---|---|---|
| 2013/0116892 A1* | 5/2013 | Wu | B60R 25/09 |
| | | | 701/45 |
| 2016/0257321 A1* | 9/2016 | Traylor | B61L 15/0081 |
| 2017/0226858 A1* | 8/2017 | Kawashima | F01C 20/04 |

OTHER PUBLICATIONS

Written Opinion for corresponding International Application No. PCT/JP2015/058857, dated Jun. 30, 2015 (6 pages).

* cited by examiner

TURNING APPARATUS AND CONTROL METHOD FOR TURNING APPARATUS

TECHNICAL FIELD

The present invention relates to a turning apparatus which rotates a rotor of a steam turbine or the like and a control method for a turning apparatus.

BACKGROUND ART

If a turbine rotor is left to not be rotated while an operation of a steam turbine or the like is stopped at a high temperature, a temperature difference inside a turbine casing occurs according to a decrease in a temperature of steam or gas inside the turbine. Due to this temperature difference, thermal distortion may occur in the turbine rotor or bending may occur in the turbine rotor due to its own weight of the turbine rotor.

Accordingly, in order to avoid the occurrence of the bending in the turbine rotor used in the steam turbine or the like, it is necessary to perform turning which rotates the turbine rotor at a lower speed during a predetermined time when the operation of the steam turbine or the like is stopped or before the steam turbine starts. In order to perform this turning, a turning apparatus which rotates a turbine rotor by power of an electric motor is widely used.

In the turning apparatus, when the turbine rotor starts a normal rotation, an excessive load is applied to the turning apparatus. In order to prevent the turning apparatus from being damaged by the load, a mechanism which removes a pinion gear to protect the turning apparatus is provided. Meanwhile, during the turning of the steam turbine or the like, the turbine rotor may reversely rotate due to occurrence of a backflow or the like of a compressor process gas. In this case, the pinion gear cannot be removed, an excessive load is applied to the turning apparatus, and thus, the turning apparatus may be damaged.

In order to avoid damage of a turning apparatus, for example, PTL 1 discloses an apparatus which includes a one-way clutch for automatically releasing a turning apparatus from a turbine rotor in a case where a rotating speed of the turbine rotor exceeds a rotating speed of the turning apparatus and a one-way clutch (a reverse rotation prevention device) for preventing (restraining) a reverse rotation of the turning apparatus.

PATENT LITERATURE

[PTL 1] Japanese Unexamined Patent Application Publication No. 2012-177328

However, in the above-described turning apparatus, the one-way clutch receives reverse rotation torque of the turbine rotor in order to prevent (restrain) the reverse rotation of the turbine rotor. When the one-way clutch prevents the reverse rotation of the turbine rotor, a load which is larger than the load at the time of a normal rotation is applied to the one-way clutch. Accordingly, the one-way clutch is damaged due to the load at the time of the reverse rotation, a frequency of replacing or repairing the one-way clutch or the turning apparatus is likely to increase.

SUMMARY

One or more embodiments of present invention provide a turning apparatus capable of decreasing the frequency of replacement and repair of the turning apparatus by preventing the turning apparatus from receiving an excessive load during the reverse rotation of the turbine rotor.

According to one or more embodiments of the present invention, a turning apparatus includes: an electric motor; a pinion gear which is rotationally driven in a first rotation direction to rotationally drive a wheel gear provided in a rotor and is configured to move to a first position at which the pinion gear can transmit a rotation of the electric motor to the wheel gear and a second position at which the pinion gear cannot transmit the rotation of the electric motor to the wheel gear; a current value detection unit which detects a current value of the electric motor in a state where the pinion gear is positioned at the first position; and a control device which controls the electric motor to rotate the pinion gear in a second rotation direction opposite to the first rotation direction based on the current value detected by the current value detection unit.

In one or more embodiments, if a force by which the rotor tries to transfer from the normal rotation to the reverse rotation is generated due to a backflow of a process gas of a compressor or the like, first, the normal rotation of the rotor stagnates. In this case, since the turning apparatus continuously tries to rotate the rotor in the normal direction, the current value of the electric motor increases by the amount corresponding to the stagnation of the normal rotation of the rotor. According to the above configuration, the control device can determine that the rotor tries to reversely rotate by detecting the change in the current values of the electric motor. Therefore, the control device can control the pinion gear such that the pinion gear reversely rotates by detecting a sign of the reverse rotation of the rotor before the reverse rotation of the rotor starts. Accordingly, in actual fact, if the reverse rotation of the rotor starts, the pinion gear is kicked away toward the second position. Therefore, it is possible to prevent the turning apparatus from receiving an excessive load generated due to the reverse rotation of the rotor.

In addition, since the control device controls the electric motor based on the current value detected by the current value detection unit, it is possible to decrease a burden of an operation that follows when an operator monitors the state of the rotor, operates the turning apparatus, or the like. In addition, it is possible to decrease risks that an operator cannot detect the reverse rotation of the rotor due to overlooking of the operator or the like and the turning apparatus receives an excessive load due to the reverse rotation of the rotor.

According to one or more embodiments, in the turning apparatus, the control device may control the electric motor such that the pinion gear rotates in the second rotation direction in a case where the current value detected by the current value detection unit exceeds a predetermined value.

In one or more embodiments, if the normal rotation of the rotor stagnates due to the backflow of the process gas of the compressor or the like, torque of the electric motor is changed (increased). In addition, if a force by which the rotor tries to transfer from the normal rotation to the reverse rotation increases, the current value of the electric motor also increases. According to this configuration, the control device can determine that the rotor is likely to reversely rotate by detecting that the current value of the electric motor exceeds a predetermined value. Accordingly, the control device can control the pinion gear such that the pinion gear reversely rotates by detecting a sign of the reverse rotation of the rotor before the reverse rotation of the rotor starts. Accordingly, in actual fact, if the reverse rotation of the rotor starts, the pinion gear is kicked away toward the second position. Therefore, it is possible to prevent the turning apparatus from receiving an excessive load generated due to the reverse rotation of the rotor. In addition, since the control device is configured to automatically control the operations, it is possible to decrease a burden of an operation that follows when an operator monitors the state of the rotor or the like.

According to one or more embodiments, the turning apparatus may further include a positive circuit which is provided between a power source and the electric motor and rotates the electric motor in the first rotation direction, and a sub circuit which is provided between the power source and the electric motor and rotates the electric motor in the second rotation direction, in which the control device may reverse a rotation direction of the electric motor by switching the positive circuit and the sub circuit.

According to this configuration of one or more embodiments, it is possible to easily perform the reverse operation of the electric motor in the rotation direction.

According to one or more embodiments of the present invention, there is provided a control method for a turning apparatus which includes an electric motor and a pinion gear which is rotationally driven in a first rotation direction to rotationally drive a wheel gear provided in a rotor and is configured to move to a first position at which the pinion gear can transmit a rotation of the electric motor to the wheel gear and a second position at which the pinion gear cannot transmit the rotation of the electric motor to the wheel gear, the method includes: rotating the rotor by engaging the pinion gear driven using a rotational driving force of the electric motor with the wheel gear to rotationally drive the wheel gear; and controlling the electric motor to rotate the pinion gear in a second rotation direction opposite to the first rotation direction based on a current value of the electric motor.

According to the turning apparatus of one or more embodiments of the present invention, it is possible to decrease the frequency of replacement and repair of the turning apparatus by preventing the turning apparatus from receiving an excessive load during the reverse rotation of the turbine rotor.

DETAILED DESCRIPTION (Structure of Turning Apparatus)

Hereinafter, a turning apparatus 30 according to one or more embodiments of the present invention will be described with reference to FIGS. 1 and 2.

For example, the turning apparatus 30 is an apparatus for rotating a turbine rotor 11 of a steam turbine (not shown) at a low speed.

In one or more embodiments, a wheel gear 12 which is integrally attached to an outer periphery of the turbine rotor 11 is provided on one end of the turbine rotor 11.

Figure 1:
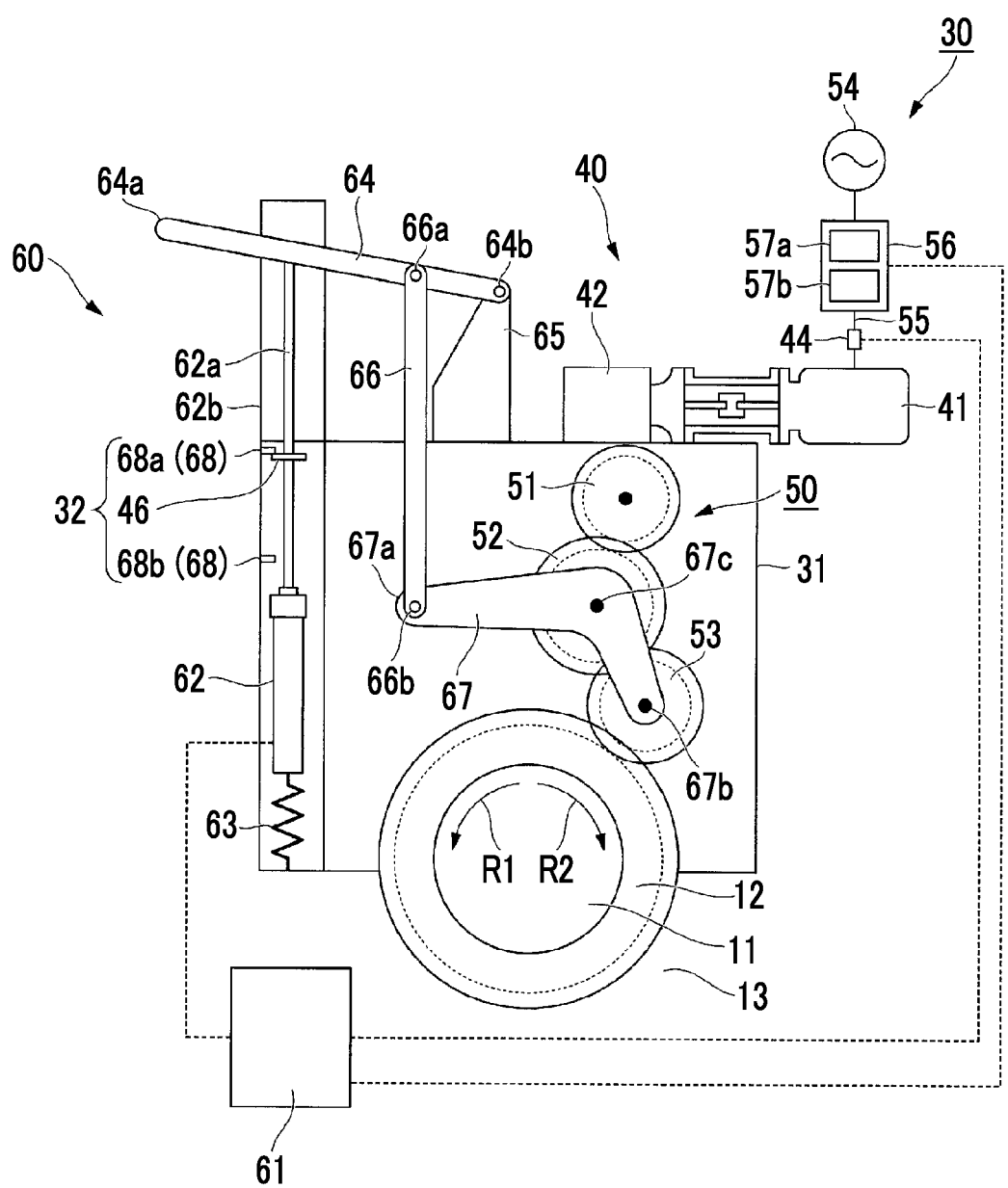
FIG. 1 is a sectional view of a turning apparatus according to one or more embodiments of the present invention.

As shown in FIG. 1, the turning apparatus 30 includes a casing 31, a power section 40, and a power transmission section 50. The turning apparatus 30 is disposed on one end of the turbine rotor 11.

In one or more embodiments, a right-left direction of FIG. 1 is referred to a width direction, an up-down direction is referred to a vertical direction, and an axial direction of the turbine rotor 11 is referred to as an axial direction.

The power section 40 includes an electric motor 41 and a speed reducer 42 which decreases the rotation speed of the electric motor 41 to a predetermined speed ratio (reduction ratio). In one or more embodiments, the power section 40 is disposed on an upper surface of the casing 31.

The electric motor 41 is connected to an AC power source 54 via a power line 55. An electric motor control section 56 is provided in the power line 55, and the electric motor control section 56 includes a positive circuit 57a for rotationally driving the electric motor 41 in a first rotation direction and a sub circuit 57b for rotationally driving the electric motor 41 in a second rotation direction which is a rotation direction opposite to the first rotation direction.

The turning apparatus 30 of one or more embodiments is configured such that a pinion gear 53 normally rotates the wheel gear 12 and the turbine rotor 11 rotates in a normal rotation direction R2 by rotating the electric motor 41 in the first rotation direction. That is, the turbine rotor 11 rotates in a reverse rotation direction R1 by rotating the electric motor 41 in the second rotation direction which is the rotation direction opposite to the first rotation direction.

A current value detector 44 is provided in the power line 55. In addition, an output shaft of the electric motor 41 and an input shaft of the speed reducer 42 are connected to each other via a coupling.

The power transmission section 50 includes an output gear 51, a connection gear 52, and a pinion gear 53. In one or more embodiments, the power transmission section 50 is disposed inside the casing 31.

A belt (not shown) is wound around the output gear 51 from the speed reducer 42, and thus, a rotational driving force is transmitted to the output gear 51.

The connection gear 52 is disposed to engage with the output gear 51 below the output gear 51. If the output gear 51 is rotated by the rotational driving force from the power section 40, the connection gear 52 also rotates.

The pinion gear 53 is disposed to engage with the connection gear 52 below the connection gear 52. The pinion gear 53 rotates according to the rotation of the connection gear 52.

Figure 2:
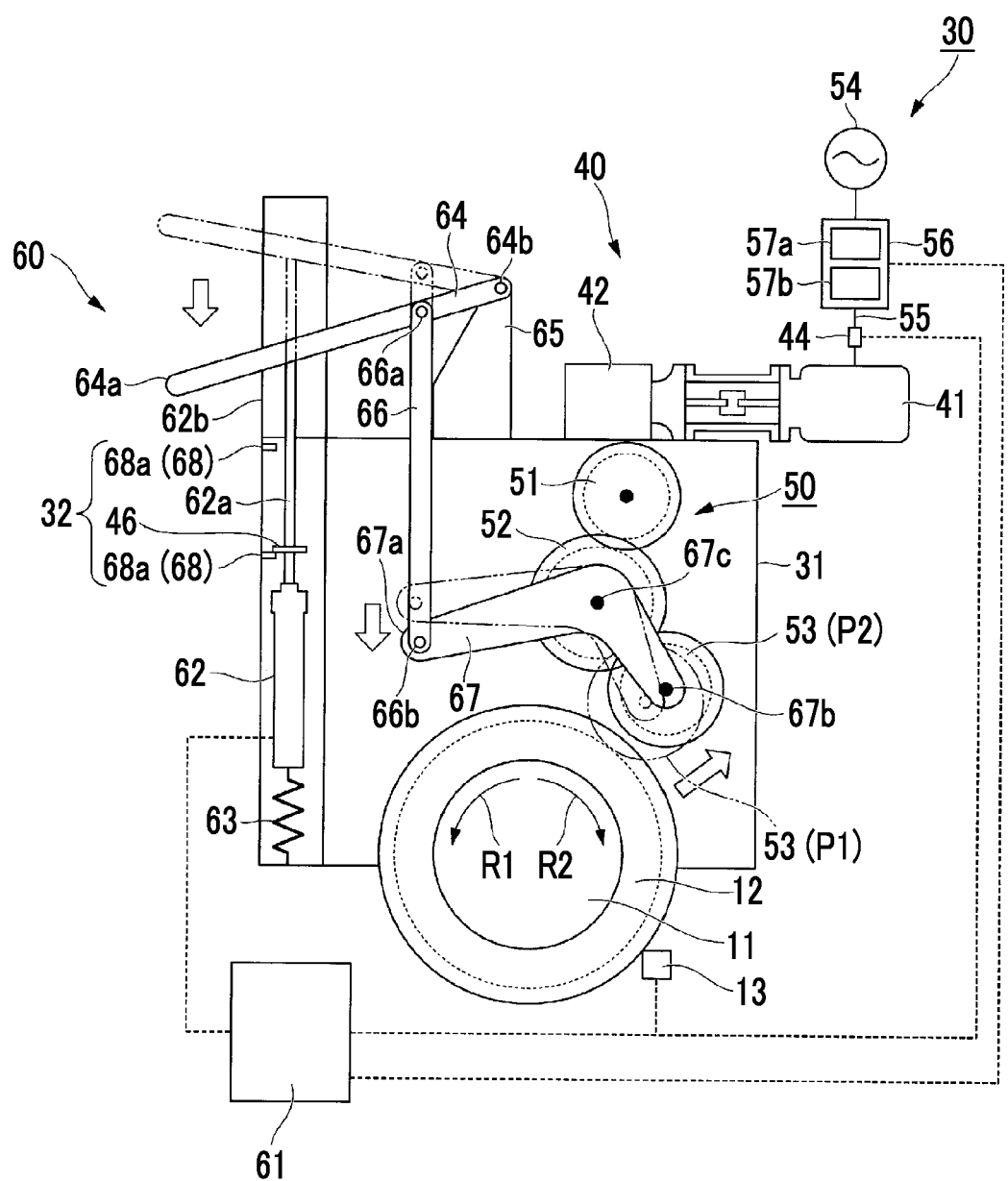
FIG. 2 is a sectional view of the turning apparatus according to one or more embodiments of the present invention.

In addition, as shown in FIG. 2, the pinion gear 53 is configured so as to be movable between a first position P1 (a position indicated by dashed lines) at which the pinion gear 53 engages with the wheel gear 12 by a movement mechanism 60 described later and a second position P2 (a position indicated by solid lines) at which the engagement between the pinion gear 53 and the wheel gear 12 is released and the pinion gear 53 is separated from the wheel gear 12 toward the outside in a radial direction by the movement mechanism 60.

When the pinion gear 53 is positioned at the first position P1, the pinion gear 53 engages with the wheel gear 12 of the turbine rotor 11 and rotates the wheel gear 12 by the rotational driving force transmitted from the power section 40. The turning apparatus 30 rotates the turbine rotor 11 by rotating the wheel gear 12. That is, when the pinion gear 53 is positioned at the first position P1, the pinion gear 53 can transmit the rotation of the electric motor 41 to the wheel gear 12.

In addition, when the pinion gear 53 is positioned at the second position P2, since the engagement between the pinion gear 53 and the wheel gear 12 of the turbine rotor 11 is released, the rotational driving force transmitted from the power section 40 is not transmitted to the wheel gear 12. That is, when the pinion gear 53 is positioned at the second position P2, the pinion gear cannot transmit the rotation of the electric motor 41 to the wheel gear 12.

As shown in FIG. 1, the movement mechanism 60 includes a control device 61, an air cylinder 62, a lever 64, a movement rod 66, and a bracket 67.

The control device 61 is connected to the electric motor control section 56, and the positive circuit 57a and the sub circuit 57b are switched by a command of the control device 61. That is, the control device 61 can control a rotation direction of the electric motor 41.

The air cylinder 62 is a power source for moving the pinion gear 53 between the first position P1 and the second position P2 according to the control of the control device 61. In one or more embodiments, the air cylinder 62 is provided on an outer surface on one side of the casing 31 in the width direction.

The air cylinder 62 includes a piston rod 62a which extends to be slidable in the vertical direction and an air cylinder case 62b in which the piston rod 62a is accommodated. The air cylinder 62 is supported by the air cylinder case 62b via a spring bush 63.

The upper end portion of the piston rod 62a extends to a position positioned above the upper surface of the casing 31 and is connected to a first end 64a side of the lever 64 extending in the width direction. In addition, a slit into which the lever 64 is inserted is vertically formed on the side surface of the air cylinder case 62b in the width direction.

A second end 64b of the lever 64 is tiltably supported by the support section 65 provided on the upper surface of the casing 31. Accordingly, the piston rod 62a of the air cylinder slides in the vertical direction, and thus, the first end 64a of the lever 64 connected to the piston rod 62a moves in the vertical direction with the second end 64b of the lever 64 supported by the support section 65 as a fulcrum.

The movement rod 66 extends in the vertical direction and an upper end 66a of the movement rod 66 is tiltably connected to a portion between a position at which the lever 64 and the piston rod 62a are connected to each other at a position positioned above the upper surface of the casing 31 and the second end 64b of the lever 64. In addition, a lower end 66b side of the movement rod 66 is inserted into the casing 31. The lever 64 is tilted according to the slide of the piston rod 62a of the air cylinder, and thus, the movement rod 66 moves in the vertical direction in conjunction with the tilting of the lever 64.

The bracket 67 is a plate-shaped member which is formed in an approximately L shape. A first end 67a of the bracket 67 is tiltably connected to the lower end 66b of the movement rod 66. In addition, a second end 67b of the bracket 67 is connected to a center shaft of the pinion gear 55, and an intermediate portion 67c of the bracket 67 is connected to a center shaft of the connection gear 52. Accordingly, in the bracket 67, according to the movement of the movement rod 66 in the vertical direction, the first end 67a moves in the vertical direction with the intermediate portion 67 as a fulcrum and the second end 67b moves in the radial direction of the wheel gear 12 with the intermediate portion 67 as a fulcrum. Specifically, as shown in FIG. 2, if the movement rod 66 moves in the down direction, the first end 67a of the bracket 67 moves in the down direction with the intermediate portion 67c of the bracket 67 as a fulcrum and the second end 67b of the bracket 67 moves toward the outside in the radial direction of the wheel gear 12. In this case, since the second end 67b of the bracket 67 is connected to the center shaft of the pinion gear 53, the pinion gear 53 also moves toward the outside in the radial direction (second position P2) of the wheel gear 12. Moreover, if the movement rod 66 moves in the up direction, the first end 67a of the bracket 67 moves in the up direction with the intermediate portion 67c of the bracket 67 as a fulcrum and the second end 67b of the bracket 67 moves toward the inside in the radial direction of the wheel gear 12 with the intermediate portion 67 as a fulcrum. In this case, since the second end 67b of the bracket 67 is connected to the center shaft of the pinion gear 53, the pinion gear 53 also moves toward the inside in the radial direction (first position P1) of the wheel gear 12.

The movement mechanism 60 includes a position detection device 32 for detecting the position of the pinion gear 53. The position detection device 32 includes a kicking member 46 which is provided on the piston rod 62a, a first limit switch 68a which is kicked by the kicking member 46 in a case where the pinion gear 53 is positioned at the first position P1, and a second limit switch 68b which is kicked by the kicking member in a case where the pinion gear 53 is positioned at the second position P2.

That is, in the case where the pinion gear 53 is positioned at the first position P1, the first limit switch 68a is turned on, that is, in the case where the pinion gear 53 is positioned at the second position P2, the second limit switch 68b is turned on.

(Operation of Turning Apparatus)

Next, the operation of the turning apparatus 30 will be described with reference to FIGS. 1 to 5.

First, if turning start is performed and the turning apparatus 30 starts, the control device 61 controls the movement mechanism 60 to position the pinion gear 53 at the first position P1 and drives the electric motor 41 using the positive circuit 57a of the electric motor control section 56. If the electric motor 41 is rotationally driven using the positive circuit 57a, the electric motor 41 rotates in the first rotation direction. In addition, the position detection device 32 detects that the pinion gear 53 is positioned at the first position P1 by the first limit switch 68a.

Figure 4:
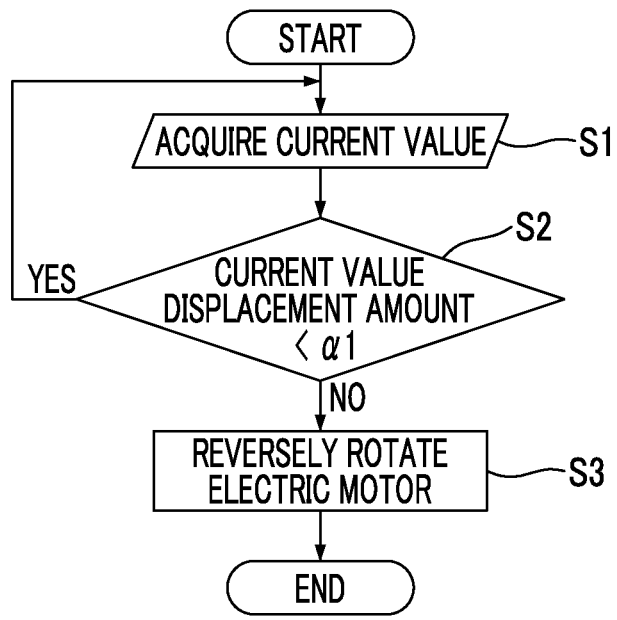
FIG. 4 is a flowchart for explaining an operation of the turning apparatus according to one or more embodiments of the present invention.

In addition, while the turning apparatus 30 is operated, the control device 61 acquires a current value of the electric motor 41 detected by the current value detector 44 at predetermined intervals (S1 in a flowchart of FIG. 4).

The rotational driving force of the electric motor 41 is transmitted to the speed reducer 42, and the speed reducer 42 decreases the rotation speed at a predetermined speed ratio (reduction ratio). In addition, the rotational driving force of the electric motor 41 is transmitted to the output gear 51 of the power transmission section 50.

The output gear 51 starts to rotate by the rotational driving force transmitted from the speed reducer 42 and rotates the connection gear 52 which engages with the output gear 51. Accordingly, the pinion gear 53 which engages with the connection gear 52 also starts to rotate.

In this case, the pinion gear 53 is positioned at the first position P1 as shown in FIG. 1. That is, the pinion gear engages with the wheel gear 12 of the turbine rotor 11.

Accordingly, the turbine rotor 11 also starts to rotate in the normal rotation direction R2 along with the wheel gear 12 by rotating the pinion gear 53.

The current value detected by the current value detector temporarily increases immediately after the turning apparatus 30 starts. In one or more embodiments, when the current value maintains a predetermined value for a fixed time after the turning apparatus 30 starts, the control device 61 determines that the state has been transferred from a turning start state to a turning state (A section in FIG. 3). Accordingly, it is determined that an increase in the current value immediately after the turning apparatus 30 starts is a start current, and an erroneous detection with respect to a reverse rotation of the turbine rotor 11 is prevented. In addition, the determination with respect to the transfer to the turning state (A) may be performed by the instruction of the control device 61 performed by the operation of an operator.

Figure 3:
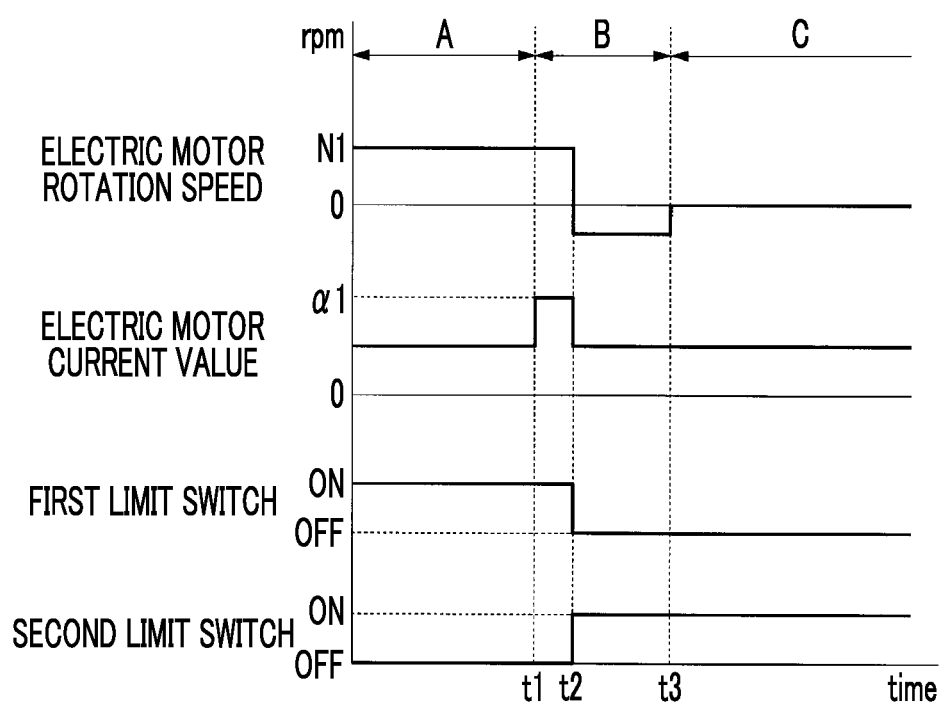
FIG. 3 is a graph showing changes in a rotation speed and a current value of an electric motor and states of limit switches for each elapse time from a turning state of the turning apparatus according to one or more embodiments of the present invention.

In the turning state (A), as shown in FIG. 3, the current value is constant at a predetermined value and the rotation speed of the turbine rotor 11 becomes a predetermined value N1.

However, if a force which rotates the turbine rotor 11 in a reverse direction is generated by a backflow of a process gas of a compressor or the like, the turbine rotor 11 may be difficult to rotate normally. In this case, torque and the current value of the electric motor 41 are higher than a predetermined value. That is, the current value of the electric motor increases (t1 in FIG. 3).

If the control device 61 detects that the current value exceeds a prescribed amount a1 (S2 in the flowchart of FIG. 4), it is determined that the control device 61 has detected a sign of the reverse rotation of the turbine rotor 11, the state is transferred from the turning state A to a pinion gear operation state B.

If control device 61 detects the sign of the reverse rotation of the turbine rotor 11, the control device 61 controls the electric motor control section 56 to rotate the electric motor 41 in the second rotation direction which is the rotation direction opposite to the first rotation direction (t2 in FIG. 3 and S3 in the flowchart of FIG. 4). That is, the control device 61 switches the circuit from the positive circuit 57a to the sub circuit 57b to reversely rotate the electric motor 41. Accordingly, the pinion gear 53 rotates in a rotation direction opposite to the direction which rotates the wheel gear 12 in the normal direction.

Figure 5:
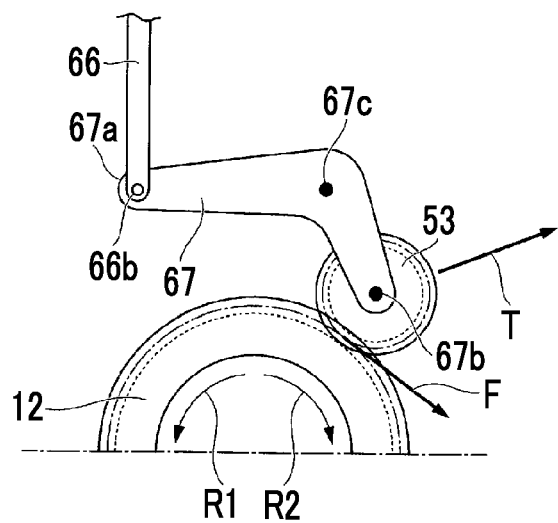
FIG. 5 is an enlarged view for explaining the operation of the turning apparatus according to one or more embodiments of the present invention.

Next, if the turbine rotor 11 starts to rotate in the reverse rotation direction R1 (the rotation direction which is the direction opposite to the normal rotation direction R2), as shown in FIG. 5, the pinion gear 53 receives a force indicated by a reference numeral F from the wheel gear 12. Accordingly, the pinion gear 53 moves in a direction indicated by a reference numeral T.

If the pinion gear 53 moves in the direction T, the engagement between the pinion gear 53 and the wheel gear 12 is released. In addition, if the pinion gear 53 moves in the direction T, the lever 64 moves the piston rod 62a in the down direction via the bracket 67 and the movement rod 66. Accordingly, the second limit switch 68b is turned on and the control device 61 recognizes that the pinion gear 53 has retreated to the second position P2.

If the control device 61 recognizes that the second limit switch 68b is turned on, the control device 61 stops the rotation of the electric motor 41 (t3 in FIG. 3) and transfers the state to a turning apparatus stop state C.

In addition, in a case where the pinion gear 53 is not sufficiently separated from the wheel gear 12, the control device 61 may move the pinion gear 53 to the second position P2 using the movement mechanism 60.

If the force of the turbine rotor 11 which reversely rotates due to the backflow or the like of the process gas of the compressor is large and the normal rotation of the turbine rotor 11 cannot be maintained, the control device 61 transfers the state from a reverse rotation sign state to a reverse rotation state of the turbine rotor 11. Here, if the state where the pinion gear 53 engages with the wheel gear 12 is maintained, the torque exceeds an upper limit value, and the rotation speed of the turbine rotor 11 becomes a negative value from zero. That is, the reverse rotation of the turbine rotor starts. Accordingly, an excessive load in the reverse rotation direction is applied to the pinion gear 53 by the turbine rotor 11 and the pinion gear 53 is likely to be damaged. In addition, this load is transmitted from the pinion gear 53 to the entire turning apparatus 30 and the turning apparatus 30 is likely to be damaged.

However, in one or more embodiments, in the reverse rotation sign state (t1) before the state is transferred to the reverse rotation state of the turbine rotor 11, the pinion gear 53 is reversely rotated and the pinion gear 53 is operated to be removed from the wheel gear 12. Accordingly, even in a case where the reverse rotation of the turbine rotor 11 starts, it is possible to prevent an excessive load from being applied to the turning apparatus 30.

Next, in one or more embodiments, effects of the turning apparatus 30 will be described.

As described above, the turning apparatus 30 of one or more embodiments is configured to reversely rotate the pinion gear 53 from the first rotation direction in which the wheel gear 12 rotates in the normal rotation direction R2 to the second rotation direction which is the rotation direction opposite to the first rotation direction based on the current value of the electric motor 41 detected by the current value detector 44. Accordingly, before the turbine rotor 11 reversely rotates, it is possible to prevent the pinion gear 53 from receiving an excessive load generated due to the reverse rotation of the turbine rotor 11 and being damaged or the like.

In addition, one or more embodiments of the present invention are configured such that the pinion gear 53 is automatically rotated in the reverse direction based on the current value of the electric motor 41, it is possible to decrease a burden of an operation that follows when an operator monitors the state of the turbine rotor 11, operates the turning apparatus 30, or the like. In addition, even in a case where the reverse rotation sign state of the turbine rotor 11 cannot be detected due to overlooking of an operator or the like, it is possible to decrease a possibility that the turning apparatus 30 receives an excessive load due to the reverse rotation of the turbine rotor 11. Accordingly, it is possible to obtain effects of preventing the pinion gear 53 engaging with the wheel gear of the turbine rotor 11 or the like from being damaged, and it is possible to decrease the frequency of replacing and repairing the turning apparatus 30.

In addition, since the pinion gear 53 is released by the reverse rotation of the electric motor 41, compared to a method of retreating the pinion gear 53 using the movement mechanism 60, it is possible to move the pinion gear 53 more rapidly to the second position P2.

As described above, in the turning apparatus 30 of one or more embodiments, the control device 61 determines that the state is in the turning state (A) when the current value of the electric motor 41 detected by the current value detector 44 maintains a predetermined time for a fixed time. Accordingly, it is possible to prevent an erroneous operation of the movement mechanism 60 due to the increase in the current value immediately after the turning apparatus 30 starts. In addition, since the control device 61 automatically detects the turning state (A), it is possible to decrease a burden of an operation that follows when an operator monitors the state of the turbine rotor 11 or the like.

As described above, in the turning apparatus 30 of one or more embodiments, in the case where the current value of the electric motor 41 in the turning state (A) exceeds the prescribed amount α1, the control device 61 determines that the state has been transferred to the reverse rotation sign state (t1). Accordingly, it is possible to automatically detect the possibility of the reverse rotation of the turbine rotor 11, and it is possible to decrease a burden of an operation that follows when an operator monitors the state of the turbine rotor 11 or the like. In addition, in actual fact, since it is possible to detect the sign of the reverse rotation before the turbine rotor 11 starts the reverse rotation, it is possible to decrease a possibility that the turning apparatus 30 receives an excessive load due to the reverse rotation of the turning rotor 11. Accordingly, it is possible to obtain effects of preventing the pinion gear 53 engaging with the wheel gear of the turbine rotor 11 or the like from being damaged, and it is possible to decrease the frequency of replacing and repairing the turning apparatus 30.

In addition, by performing the reverse rotation of the electric motor 41 by switching between the positive circuit 57a and the sub circuit 57b, it is possible to easily perform the reverse operation of the electric motor 41 in the rotation direction.

In addition, by providing the current value detector 44 in the power line 55, it is possible to easily install the current value detection unit without installing a device for detecting the current value.

Hereinbefore, various embodiments of the invention were described in detail above. However, the present invention is not limited to the above described embodiments as long as it does not depart from the technical ideas of the present invention, and some design changes or the like can be applied.

For example, in the above-described embodiments, the configuration is described in which the control device 61 determines that the state is the turning state (A) when the current value of the electric motor 41 detected by the current value detector 44 maintains a predetermined value for a fixed time. In addition, the configuration is described in which the control device 61 determines that the state has been transferred to the reverse rotation sign state (t1) in the case where the current value in the turning state (A) exceeds the prescribed amount α1. However, the present invention is not limited to this.

Since the start current at the time of starting is significantly large, the control device 61 may determine that the current is the start current when the current value exceeds a prescribed amount a2. That is, the control device 61 may determine that the state has been transferred to the reverse rotation sign state (C) in a case where the current value is within a range from the prescribed amount α1 to the prescribed amount a2. According to this configuration, effects similar to those of the above-described embodiments can be obtained.

Moreover, the control device 61 may determine that the state has been transferred to the reverse rotation sign state (t1) in a case where the rotation speed of the turbine rotor 11 in the turning state (A) is lower than a predetermined value. According to this configuration, effects similar to those of the above-described embodiments can be obtained.

In addition, the control device 61 may determine whether or not the state is transferred to the reverse rotation sign state (t1) by combining the determination based on the rotation speed of the turbine rotor 11 and the determination based on the current value described above. The control device 61 can determine that the normal rotation of the turbine 11 stagnates and the turbine rotor 11 is likely to reversely rotate by detecting the change (decrease) in the rotation speed of the turbine rotor 11. Therefore, according to the change in the torque and the current value due to the factors other than the reverse rotation of the turbine rotor 11, the control device 61 can prevent an erroneous operation of reversely rotating the pinion gear 53.

In addition, a method of reversing the rotation direction of the electric motor 41 is not limited to the above-described method, and various methods can be adopted.

INDUSTRIAL APPLICABILITY

According to the above-described turning apparatus of one or more embodiments, it is possible to decrease the frequency of replacement and repair of the turning apparatus by preventing the turning apparatus from receiving an excessive load during the reverse rotation of the turbine rotor.

REFERENCE SIGNS LIST

11: turbine rotor (rotor)
12: wheel gear
30: turning apparatus
31: casing
32: position detection device
40: power section
41: electric motor
42: speed reducer
44: current value detector (current value detection unit)
46: kicking member
50: power transmission section
51: output gear
52: connection gear
53: pinion gear
54: AC power source
55: power line
56: electric motor control section
57a: positive circuit
57b: sub circuit
60: movement mechanism
61: control device
62: air cylinder
62a: piston rod
62b: air cylinder case
64: lever
65: support section
66: movement rod
67: bracket
68: limit switch
68a: first limit switch
68b: second limit switch
P1: first position
P2: second position Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A turning apparatus used for a steam turbine, the turning apparatus comprising:
   an electric motor;
   a pinion gear that is rotationally driven in a first rotation direction to rotationally drive a wheel gear provided in a rotor, and that moves to a first position where the pinion gear can transmit a rotation of the electric motor to the wheel gear and a second position where the pinion gear cannot transmit the rotation of the electric motor to the wheel gear;
   a current value detection unit that detects a current value of the electric motor in a state where the pinion gear is positioned at the first position; and
   a control device that controls the electric motor to rotate the pinion gear in a second rotation direction opposite to the first rotation direction based on the current value detected by the current value detection unit, wherein
   the control device comprises an electric motor control section that controls the electric motor,
   the control device automatically detects a sign of a reverse rotation of the rotor,
   the electric motor control section is controlled such that the pinion gear rotates in the second rotation direction when the current value detected by the current value detection unit exceeds a predetermined value, and
   the pinion gear is operated to be removed from the wheel gear.

2. The turning apparatus according to claim 1, wherein the electric motor control section comprises:
   a positive circuit provided between a power source and the electric motor that rotates the electric motor in the first rotation direction; and
   a sub circuit provided between the power source and the electric motor that rotates the electric motor in the second rotation direction,
   wherein the control device reverses a rotation direction of the electric motor by switching the positive circuit and the sub circuit.

3. A control method for a turning apparatus used for a steam turbine, the turning apparatus comprising an electric motor, a pinion gear, and an electric motor control section that controls the electric motor, wherein the pinion gear is rotationally driven in a first direction to rotationally drive a wheel gear provided in a rotor and moves to a first position where the pinion gear can transmit a rotation of the electric motor to the wheel gear and a second position where the pinion gear cannot transmit the rotation of the electric motor to the wheel gear, the method comprising:
   rotating the rotor by engaging the pinion gear, driven using a rotational driving force of the electric motor, with the wheel gear to rotationally drive the wheel gear;
   controlling the electric motor control section by automatically detecting a sign of a reverse rotation of the rotor when a current value of the electric motor exceeds a predetermined value; and
   rotating the pinion gear in a second rotation direction opposite to the first rotation direction when the current value of the electric motor exceeds the predetermined value and operating the pinion gear to be removed from the wheel gear.

* * * * *